US010883402B2

United States Patent
Wang et al.

(10) Patent No.: US 10,883,402 B2
(45) Date of Patent: Jan. 5, 2021

(54) TITANIA-DOPED ZIRCONIA AS PLATINUM GROUP METAL SUPPORT IN CATALYSTS FOR TREATMENT OF COMBUSTION ENGINE EXHAUSTS STREAMS

(71) Applicant: BASF CORPORATION, Florham Park, NJ (US)

(72) Inventors: Xiaoming Wang, Springfield, NJ (US); Michel Deeba, East Brunswick, NJ (US); Xiaolai Zheng, Princeton Junction, NJ (US); Sven Titlbach, Heidelberg (DE); Andreas Sundermann, Bensheim (DE); Stephan Andreas Schunk, Heidelberg (DE)

(73) Assignee: BASF Corporation, Florham Park, NJ (US)

(*) Notice: Subject to any disclaimer, the term of this patent is extended or adjusted under 35 U.S.C. 154(b) by 0 days.

(21) Appl. No.: 16/278,654

(22) Filed: Feb. 18, 2019

(65) Prior Publication Data

US 2019/0178128 A1 Jun. 13, 2019

Related U.S. Application Data

(62) Division of application No. 15/508,744, filed as application No. PCT/US2015/047386 on Aug. 28, 2015, now Pat. No. 10,247,071.

(60) Provisional application No. 62/046,465, filed on Sep. 5, 2014.

(51) Int. Cl.
*B01J 21/06* (2006.01)
*B01J 23/00* (2006.01)
(Continued)

(52) U.S. Cl.
CPC ............ *F01N 3/101* (2013.01); *B01D 53/945* (2013.01); *B01J 21/066* (2013.01); *B01J 23/002* (2013.01); *B01J 23/10* (2013.01); *B01J 23/46* (2013.01); *B01J 23/464* (2013.01); *B01J 23/63* (2013.01); *B01J 37/0201* (2013.01); *B01J 37/0215* (2013.01); *B01J 37/0236* (2013.01);
(Continued)

(58) Field of Classification Search
CPC ........ B01J 21/06; B01J 21/063; B01J 21/066; B01J 23/002; B01J 23/10; B01J 37/0201; B01J 37/0215; B01J 37/0236; B01J 37/0244; B01J 37/0248; B01J 37/03; B01J 37/031; B01J 37/04; B01J 37/08
USPC ........................................ 502/349, 350, 439
See application file for complete search history.

(56) References Cited

U.S. PATENT DOCUMENTS

| 4,904,633 | A | | 2/1990 | Ohata |
| 5,082,820 | A | * | 1/1992 | Mitsui ................. B01D 53/865 502/349 |

(Continued)

FOREIGN PATENT DOCUMENTS

| EP | 1036767 A1 | 9/2000 |
| JP | H04166228 A | 6/1992 |
| JP | 2001025645 A | 1/2001 |

*Primary Examiner* — Cam N. Nguyen
(74) *Attorney, Agent, or Firm* — Baltazar Gomez

(57) ABSTRACT

Composites of mixed metal oxides for an exhaust gas purifying catalyst comprise the following co-precipitated materials by weight of the composite: zirconia in an amount in the range of 55-99%; titania in an amount in the range of 1-25%; a promoter and/or a stabilizer in an amount in the range of 0-20%. These composites are effective as supports for platinum group metals (PGMs), in particular rhodium.

5 Claims, 3 Drawing Sheets

(51) Int. Cl.
  *B01J 23/10* (2006.01)
  *B01J 37/02* (2006.01)
  *B01J 37/03* (2006.01)
  *B01J 37/04* (2006.01)
  *B01J 37/08* (2006.01)
  *F01N 3/10* (2006.01)
  *B01J 23/63* (2006.01)
  *B01D 53/94* (2006.01)
  *B01J 23/46* (2006.01)
  *B01J 23/58* (2006.01)
  *B01J 35/10* (2006.01)
  *B01J 37/00* (2006.01)

(52) U.S. Cl.
  CPC ....... *B01J 37/0244* (2013.01); *B01J 37/0248* (2013.01); *B01J 37/03* (2013.01); *B01J 37/031* (2013.01); *B01J 37/04* (2013.01); *B01J 37/08* (2013.01); *B01D 2255/102* (2013.01); *B01D 2255/1025* (2013.01); *B01D 2255/204* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/20707* (2013.01); *B01D 2255/20715* (2013.01); *B01D 2255/20776* (2013.01); *B01D 2255/30* (2013.01); *B01J 23/58* (2013.01); *B01J 35/1014* (2013.01); *B01J 37/0018* (2013.01); *B01J 37/0219* (2013.01); *B01J 37/0225* (2013.01); *B01J 2523/00* (2013.01); *Y02T 10/12* (2013.01)

(56) References Cited

U.S. PATENT DOCUMENTS

| | | | | |
|---|---|---|---|---|
| 5,580,536 A | 12/1996 | Yao et al. | | |
| 5,684,116 A * | 11/1997 | Martl | ...................... | C08G 63/87 528/176 |
| 5,804,152 A | 9/1998 | Miyoshi et al. | | |
| 6,124,367 A * | 9/2000 | Plecha | ...................... | C10G 2/33 518/715 |
| 6,391,276 B1 * | 5/2002 | Suda | ................... | B01D 53/9422 252/519.12 |
| 6,852,665 B2 * | 2/2005 | Morikawa | ............ | B01D 53/945 502/302 |
| 6,855,661 B2 * | 2/2005 | Kim | ...................... | B01D 53/945 502/216 |
| 7,037,875 B2 | 5/2006 | Hu et al. | | |
| 7,220,702 B2 * | 5/2007 | Hara | ................... | B01D 53/8628 502/302 |
| 7,229,947 B2 * | 6/2007 | Hara | ................... | B01D 53/8628 502/327 |
| 7,521,394 B2 * | 4/2009 | Xie | ........................ | B01J 21/063 423/610 |
| 7,820,583 B2 * | 10/2010 | Fu | .......................... | B82Y 30/00 502/208 |
| 7,842,641 B2 * | 11/2010 | Fu | .......................... | B82Y 30/00 502/172 |
| 7,858,201 B2 * | 12/2010 | Masaki | ................... | B01J 37/033 428/469 |
| 8,075,859 B2 * | 12/2011 | Fu | .......................... | B82Y 30/00 423/239.1 |
| 8,138,116 B2 * | 3/2012 | Ho | ........................ | B01J 21/063 502/170 |
| 8,148,295 B2 | 4/2012 | Augustine et al. | | |
| 8,465,714 B2 | 6/2013 | Augustine et al. | | |
| 8,501,132 B2 * | 8/2013 | Fu | .......................... | B82Y 30/00 423/239.1 |
| 8,563,462 B2 * | 10/2013 | Verdier | ............... | B01D 53/8628 502/242 |
| 8,617,502 B2 | 12/2013 | Augustine et al. | | |
| 8,623,778 B2 * | 1/2014 | Verdier | ............... | B01D 53/8628 502/242 |
| 2004/0077495 A1 | 4/2004 | Hara et al. | | |
| 2005/0032637 A1 | 2/2005 | Kim | | |
| 2007/0264174 A1 | 11/2007 | Willigan et al. | | |
| 2009/0025375 A1 | 1/2009 | Poojary et al. | | |
| 2010/0247411 A1 | 9/2010 | Larcher et al. | | |
| 2012/0270730 A1 | 10/2012 | Imoto | | |
| 2013/0115144 A1 | 5/2013 | Golden et al. | | |

\* cited by examiner

TITANIA-DOPED ZIRCONIA AS PLATINUM GROUP METAL SUPPORT IN CATALYSTS FOR TREATMENT OF COMBUSTION ENGINE EXHAUSTS STREAMS

CROSS-REFERENCE TO RELATED APPLICATIONS

This application is a division of U.S. application Ser. No. 15/508,744, filed on Mar. 3, 2017, now granted as U.S. Pat. No. 10,247,071, which is a national stage filing under 35 U.S.C. 371 of PCT/US2015/047386, filed Aug. 28, 2015, which International Application was published by the International Bureau in English on Mar. 10, 2016, and claims priority from U.S. Provisional Application No. 62/046,465, filed on Sep. 5, 2014, which applications are hereby incorporated in their entirety by reference in this application.

TECHNICAL FIELD

The present invention is directed to a mixed metal oxide support for an exhaust gas purifying catalyst and methods for its use. More particularly, provided are titania-doped zirconia supports for a platinum group metals (PGMs). Specifically, titania-zirconia supports with optional additions of promoters, such as lanthana, or stabilizers, support rhodium for providing excellent three-way conversion (TWC) catalytic activity at low temperatures (for example below 350° C. or below 400° C.).

BACKGROUND

Emission standards for unburned hydrocarbons, carbon monoxide and nitrogen oxide contaminants continue to become more stringent. In order to meet such standards, catalytic converters containing a three-way conversion (TWC) catalyst are located in the exhaust gas line of internal combustion engines. Such catalysts promote the oxidation by oxygen in the exhaust gas stream of unburned hydrocarbons and carbon monoxide as well as the reduction of nitrogen oxides to nitrogen. Government regulations (such as LEVIII in the US and Euro 6 & 7 in Europe) are targeting emissions during cold start and before the catalyst has fully warmed up. One strategy to address this is to ensure platinum group metals (PGMs) are delivered by supports that do not interfere with and that enhance performance of PGMs at lower temperatures.

A catalyst with lanthanide-doped zirconia as a support for TWC applications is presented in U.S. Patent Appln. Pub. No. 2013/0115144. WO9205861 discusses a co-formed ceria-zirconia composite to be used to support rhodium where a base metal oxide may be co-dispersed onto the support with the rhodium as a promoter.

There is a continuing need in the art to provide catalytic articles that provide excellent catalytic activity and/or light-off performance and/or efficient use of components to achieve regulated emissions.

SUMMARY

Provided are composites of mixed metal oxides for an exhaust gas purifying catalyst, and methods of making and using the same. These composites are effective as supports for platinum group metals (PGMs), in particular rhodium.

A first aspect provides composites of mixed metal oxides for an exhaust gas purifying catalyst, the composites comprising, by weight: zirconia in an amount in the range of 55-99%; titania in an amount in the range of 1-25%; a promoter and/or a stabilizer in an amount in the range of 0-20%. The promoter may comprise a rare earth metal oxide and is present in an amount in the range of 0.1-20%. The promoter may comprise lanthana, tungsta, ceria, neodymia, gadolinia, yttria, praseodymia, samaria, hafnia, or combinations thereof. The stabilizer may be present in an amount in the range of 0.1-5% and comprise silicon oxide. The stabilizer may be present in an amount in the range of 0.1-10% and comprise an alkaline earth metal oxide. The ceria content of the composite may be 20% or less by weight, or 10% or less, or 5% or less, or 1% or less, or 0.1% or less, or even 0%.

The composite may comprise the zirconia, the titania, and the promoter and/or the stabilizer all in a co-precipitated state. Or, the composite may comprise the zirconia and the promoters and/or stabilizers in a co-precipitated state and the titania is impregnated from a titania precursor. The titania precursor may comprise a titanium salt, a titanium-containing organic complex, a titania sol, or colloidal titania.

The composite may have a surface area in the range of 10-40 m$^2$/g after oven aging for 12 hours at 1000° C.

Another aspect provides catalyst composites for treatment of an exhaust stream of a combustion engine, the catalyst composites comprising a catalytic material on a carrier, the catalytic material comprising: a platinum group metal (PGM) supported on any of the mixed metal oxide composites disclosed herein. The catalyst composites may comprise a rhodium in an amount in the range of 0.1 to 5% by weight. The catalyst composites may comprise a titania to rhodium weight ratio in the range of 5 to 250. The catalyst composites may comprises 0.25% by weight rhodium, which after aging at 950° C. is effective to provide conversion of 50% or more of carbon monoxide and nitrogen oxides; and conversion of 10% or more of hydrocarbons at lambdas in the range of 0.98 to 1.02 during a lean-rich lambda sweep test at 300° C.

In a further aspect, a system for treatment of an exhaust stream including hydrocarbons, carbon monoxide, and nitrogen oxides of an internal combustion engine comprises: an exhaust conduit in fluid communication with the internal combustion engine via an exhaust manifold; and any catalyst composite disclosed herein.

In another aspect, a method for treating exhaust gases comprises contacting a gaseous stream comprising hydrocarbons, carbon monoxide, and nitrogen oxides with any catalyst composite disclosed herein. The mixed metal oxide composite may comprise, by weight: zirconia in an amount in the range of 55-90%; titania in an amount in the range of 5-25%; a promoter comprising lanthanum oxide in an amount in the range of 5-20% and the platinum group metal comprises rhodium in an amount of 0.25%; and after aging at 950° C., the catalyst composite may be effective to provide conversion of 50% or more of carbon monoxide and nitrogen oxides; and conversion of 10% or more of hydrocarbons at lambdas in the range of 0.98 to 1.02 during a lean-rich lambda sweep test at 300° C.

Also provided are methods of making a composite of mixed metal oxides comprising: obtaining or forming a first aqueous solution of a salt of zirconium, a salt of a metal promoter, and, optionally, a salt of a stabilizer; obtaining or forming a second aqueous solution of a salt of titanium; mixing the first and second aqueous solutions; and co-precipitating the zirconia, the optional metal of the promoter or stabilizer, and the titania under basic conditions; thereby forming a co-precipitated mixed metal oxide composite. The method may further comprise drying and calcining the co-precipitated mixed metal oxide composite.

Also provided are methods of making a composite of mixed metal oxides comprising: obtaining a co-precipitated zirconia and metal promoter and optional stabilizer; obtaining an aqueous solution of a precursor of titanium; impregnating the co-precipitated zirconia and metal promoter with the precursor of titanium; thereby forming a mixed metal oxide composite.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
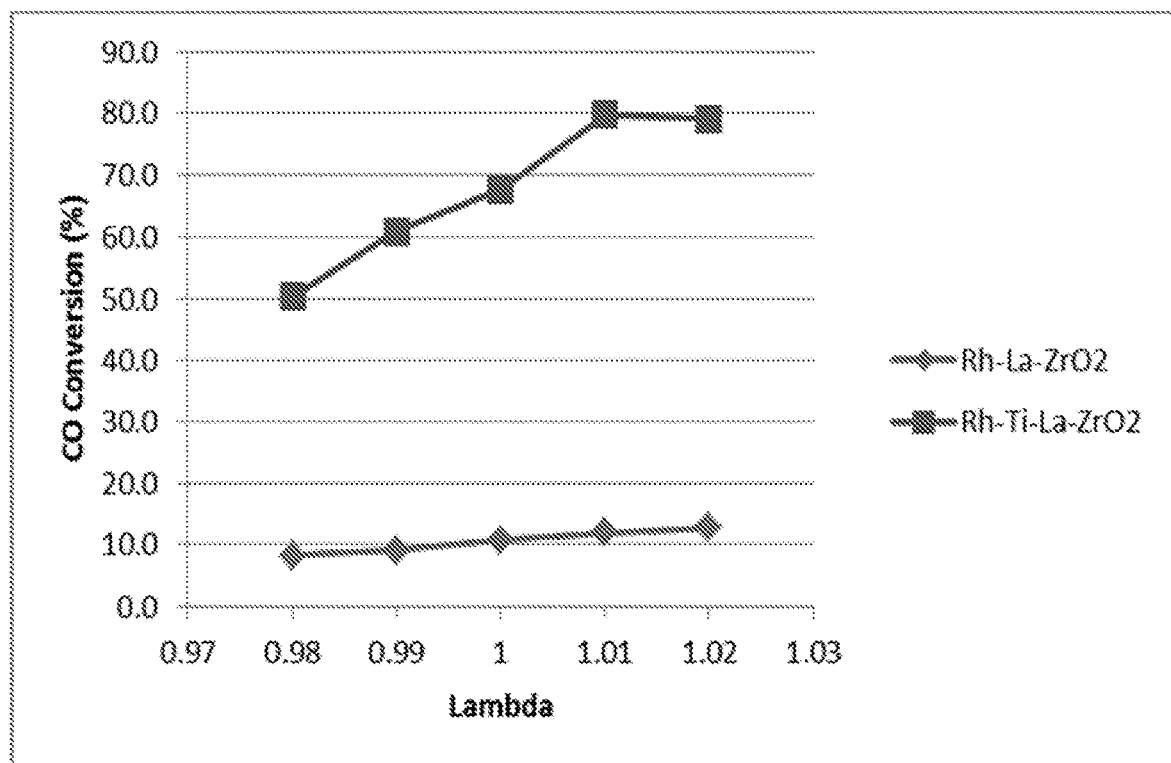
FIG. 1 provides a graph of carbon monoxide (CO) conversion versus lambda at 300° C.

Composites of mixed metal oxides comprise, by weight of the composite: zirconia in an amount in the range of 55-99%; titania in an amount in the range of 1-25%; a promoter and/or a stabilizer in an amount in the range of 0-20%, which are effective as a support for a platinum group metal (PGM). PGMs, in particular rhodium, are supported thereon in a washcoat, which is coated onto a carrier for use as an catalyst composite or article for treatment downstream of a combustion engine, for example, an automotive engine.

The following definitions are used herein.

A platinum group metal (PGM) component refers to any compound that includes a PGM. For example, the PGM may be in metallic form—zero valance, or the PGM may be in an oxide form. Reference to PGM component allows for the presence of the PGM in any valance state. For example, rhodium may be present in $Rh^0$ and/or $Rh^{3+}$, or any other oxidation states.

"BET surface area" has its usual meaning of referring to the Brunauer-Emmett-Teller method for determining surface area by $N_2$-adsorption measurements. Unless otherwise stated, "surface area" refers to BET surface area.

"Support" in a catalytic material or catalyst washcoat refers to a material that receives precious metals, stabilizers, promoters, binders, and the like through precipitation, association, dispersion, impregnation, or other suitable methods. The composites of mixed metal oxides comprising zirconia, titania, and optionally promoters and/or stabilizers disclosed herein are effective as supports. Examples of other supports include, but are not limited to, refractory metal oxides, including high surface area refractory metal oxides, composites containing oxygen storage components, and the mixed metal oxides disclosed herein.

"Transition metal oxides" (TMOs) refer to one or more oxides of the metals of Groups 3-12 of the Periodic Table of Elements.

"Refractory metal oxide supports" include bulk alumina, ceria, zirconia, titania, silica, magnesia, neodymia, and other materials are known for such use. Such materials are considered as providing durability to the resulting catalyst.

"High surface area refractory metal oxide supports" refer specifically to support particles having pores larger than 20 Å and a wide pore distribution. High surface area refractory metal oxide supports, e.g., alumina support materials, also referred to as "gamma alumina" or "activated alumina," typically exhibit a BET surface area of fresh material in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases.

"Rare earth metal oxides" refer to one or more oxides of scandium, yttrium, and the lanthanum series defined in the Periodic Table of Elements. Rare earth metal oxides can be both exemplary oxygen storage components and promoter materials. Examples of suitable oxygen storage components include ceria, praseodymia, or combinations thereof. Delivery of ceria can be achieved by the use of, for example, ceria, a mixed oxide of cerium and zirconium, and/or a mixed oxide of cerium, zirconium, and other rare earth element(s). Suitable promoters include one or more non-reducible oxides of one or more rare earth metals selected from the group consisting of lanthanum, tungsten, cerium, neodymium, gadolinium, yttrium, praseodymium, samarium, hafnium, and mixtures thereof.

"Alkaline earth metal oxides" refer to Group II metal oxides, which are exemplary stabilizer materials. Suitable stabilizers include one or more non-reducible metal oxides wherein the metal is selected from the group consisting of barium, calcium, magnesium, strontium and mixtures thereof. Preferably, the stabilizer comprises one or more oxides of barium and/or strontium.

"Washcoat" is a thin, adherent coating of a catalytic or other material applied to a refractory substrate, such as a honeycomb flow through monolith substrate or a filter substrate, which is sufficiently porous to permit the passage there through of the gas stream being treated. A "washcoat layer," therefore, is defined as a coating that is comprised of support particles. A "catalyzed washcoat layer" is a coating comprised of support particles impregnated with catalytic components.

Mixed Metal Oxide Support Materials

Ti—La—$ZrO_2$ support materials are prepared as follows. One exemplary method is to co-precipitate desired ingredients: titanium and zirconium and any desired promoters. Another exemplary method is to provide a co-precipitated zirconia composite (except a Ce—Zr, for example, a La—$ZrO_2$) and then impregnate with a titanium precursor.

A co-precipitate of all desired material is prepared by preparing two solutions. A first aqueous solution comprises a salt of zirconium salt (for example, zirconium nitrate). A second aqueous solution comprises a salt of lanthanum (for example, lanthanum nitrate) and a titania precursor. The solutions were added to an aqueous solution of ammonia ($NH_3$), and the mixture was held at a pH of ~9.0. A filtrate is obtained by drying and treating with an acid such as lauric acid. Further washing, drying, and calcining of the filtrate is conducted to obtain a the desired composite. Zirconia is generally going to be present in an amount in the range of 55-99 wt-%; titania in an amount in the range of 1-25 wt-%; and optionally a promoter and/or a stabilizer in an amount in the range of 0-20 wt-%.

In another method, the composite material can also be made by impregnation of a titania precursor (a titanium compound or titania sol) on a high surface area co-precipitated La-stabilized zirconia composite.

The support materials may be characterized in many ways. For example, crystal form of the titanium may be determined by X-Ray Diffraction (XRD). Surface area of fresh support materials may be in the range of 60-90 m$^2$/g. Aged support materials may have a surface area in the range of 10-40 m$^2$/g after oven aging for 12 hours at 1000° C. The weight ratio of titania to rhodium may be in the range of 5 to 250.

Catalytic Materials

Catalytic materials are prepared as follows. A desired platinum group metal (PGM) is supported on the Ti—La—ZrO$_2$ support by methods known in the art, for example, impregnated incipient wetness techniques.

Catalyst Composites

Once the catalytic materials are prepared, a catalyst composite may be prepared in one or more layers on a carrier. A dispersion of any of the catalytic materials as described herein may be used to form a slurry for a washcoat.

To the slurry may be added any desired additional ingredients such as other platinum group metals, other supports, other stabilizers and promoters, and one or more oxygen storage components.

In one or more embodiments, the slurry is acidic, having a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry. The slurry may thereafter comminuted to result in substantially all of the solids having particle sizes of less than about 20 microns, i.e., between about 0.1-15 microns, in an average diameter. The comminution may be accomplished in a ball mill or other similar equipment, and the solids content of the slurry may be, e.g., about 10-50 wt. %, more particularly about 10-40 wt. %. The carrier may then be dipped one or more times in such slurry or the slurry may be coated on the carrier such that there will be deposited on the carrier the desired loading of the washcoat/metal oxide composite, e.g., about 0.5 to about 3.0 g/in$^3$.

Thereafter the coated carrier is calcined by heating, e.g., at 500-600° C. for about 1 to about 3 hours.

Typically, when platinum group metal is desired, a metal component is utilized in the form of a compound or complex to achieve dispersion of the component on a refractory metal oxide support, e.g., activated alumina or a ceria-zirconia composite. For the purposes herein, the term "metal component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. During the calcination step, or at least during the initial phase of use of the composite, such compounds are converted into a catalytically active form of the metal or a compound thereof.

Additional layers may be prepared and deposited upon previous layers in the same manner as described above for deposition any layer upon the carrier.

Carrier

In one or more embodiments, the catalytic material is disposed on a carrier.

The carrier may be any of those materials typically used for preparing catalyst composites, and will preferably comprise a ceramic or metal honeycomb structure. Any suitable carrier may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section.

The carrier can also be a wall-flow filter substrate, where the channels are alternately blocked, allowing a gaseous stream entering the channels from one direction (inlet direction), to flow through the channel walls and exit from the channels from the other direction (outlet direction). A dual oxidation catalyst composition can be coated on the wall-flow filter. If such a carrier is utilized, the resulting system will be able to remove particulate matters along with gaseous pollutants. The wall-flow filter carrier can be made from materials commonly known in the art, such as cordierite or silicon carbide.

The carrier may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The carriers useful for the catalysts of the present invention may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface of the metal carriers may be oxidized at high temperatures, e.g., 1000° C. and higher, to improve the resistance to corrosion of the alloys by forming an oxide layer on the surfaces of the carriers. Such high temperature-induced oxidation may enhance the adherence of the refractory metal oxide support and catalytically promoting metal components to the carrier.

In alternative embodiments, one or more catalyst compositions may be deposited on an open cell foam substrate. Such substrates are well known in the art, and are typically formed of refractory ceramic or metallic materials.

Before describing several exemplary embodiments of the invention, it is to be understood that the invention is not limited to the details of construction or process steps set forth in the following description. The invention is capable of other embodiments and of being practiced in various ways. In the following, preferred designs are provided, including such combinations as recited used alone or in unlimited combinations, the uses for which include catalysts, systems, and methods of other aspects of the present invention.

Embodiments

Various embodiments are listed below. It will be understood that the embodiments listed below may be combined with all aspects and other embodiments in accordance with the scope of the invention.

Embodiment one is a composite of mixed metal oxides for an exhaust gas purifying catalyst, comprising zirconia, titania, and a promoter and/or a stabilizer.

Embodiment two is a catalyst composite for treatment of an exhaust stream of a combustion engine, the catalyst composites comprising a catalytic material on a carrier, the catalytic material comprising: a platinum group metal (PGM) supported on any of the mixed metal composites disclosed herein.

Embodiment three is a system for treatment of an exhaust stream including hydrocarbons, carbon monoxide, and nitrogen oxides of an internal combustion engine comprising: an exhaust conduit in fluid communication with the internal combustion engine via an exhaust manifold; and any of the catalyst composites disclosed herein.

Embodiment four is a method for treating exhaust gases comprises contacting a gaseous stream comprising hydrocarbons, carbon monoxide, and nitrogen oxides with any the catalyst composites disclosed herein.

Embodiment five is a method of making a composite of mixed metal oxides comprising: obtaining or forming a first aqueous solution of a salt of zirconium, a salt of a metal promoter, and, optionally, a salt of a stabilizer; obtaining or forming a second aqueous solution of a salt of titanium; mixing the first and second aqueous solutions; and co-precipitating the zirconium, the optional metal of the promoter or stabilizer, and the titanium under basic conditions; thereby forming a co-precipitated mixed metal oxide composite.

Embodiment six is a method of making a composite of mixed metal oxides comprising: obtaining a co-precipitated zirconia and metal promoter and optional stabilizer; obtaining an aqueous solution of a precursor of titanium; impregnating the co-precipitated zirconia and metal promoter with the precursor of titanium; thereby forming a co-precipitated mixed metal oxide composite.

Each of embodiments one through six herein may have the following design features, alone or in combination:

the mixed metal oxide composites may comprise, by weight: zirconia in an amount in the range of 55-99%; titania in an amount in the range of 1-25%; a promoter and/or a stabilizer in an amount in the range of 0-20%;

the promoter may comprise a rare earth metal oxide and is present in an amount in the range of 0.1-20%;

the promoter may comprise lanthana, tungsta, ceria, neodymia, gadolinia, yttria, praseodymia, samaria, hafnia, or combinations thereof;

the stabilizer may be present in an amount in the range of 0.1-5% and comprise silicon oxide;

the stabilizer may be present in an amount in the range of 0.1-10% and comprise an alkaline earth metal oxide;

the ceria content of the mixed metal oxide composite may be 20% or less by weight, or 10% or less, or 5% or less, or 1% or less, or 0.1% or less, or even 0%;

the mixed metal oxide composite may comprise the zirconia, the titania, and the promoter and/or the stabilizer all in a co-precipitated state;

the mixed metal oxide composite may comprise the zirconia and the promoters and/or stabilizers in a co-precipitated state and the titania is impregnated from a titania precursor;

the titania precursor may comprise a titanium salt, a titanium-containing organic complex, a titania sol, or colloidal titania;

the mixed metal oxide composite may have a surface area in the range of 10-40 $m^2/g$ after oven aging for 12 hours at 1000° C.

the catalyst composites may comprise a rhodium in an amount in the range of 0.1 to 5% by weight and the wt. % is based on the total weight of the composite;

the catalyst composites may comprise a titania to rhodium weight ratio in the range of 5 to 250;

the catalyst composites may comprises 0.1 to 5% by weight of rhodium, for example 0.25% by weight rhodium, which after aging at 950° C. is effective to provide conversion of 50% or more of carbon monoxide, nitrogen oxides, and hydrogen; and conversion of 10% or more of hydrocarbons at lambdas in the range of 0.98 to 1.02 during a lean-rich lambda sweep test at 300° C.;

the mixed metal oxide composite may comprise, by weight: zirconia in an amount in the range of 55-90%; titania in an amount in the range of 5-25%; a promoter comprising lanthanum oxide in an amount in the range of 5-20% and the platinum group metal comprises rhodium in an amount of 0.25%; and after aging at 950° C., the catalyst composite may be effective to provide conversion of 50% or more of carbon monoxide, nitrogen oxides, and hydrogen; and conversion of 10% or more of hydrocarbons at lambdas in the range of 0.98 to 1.02 during a lean-rich lambda sweep test at 300° C.; and the methods may further comprise drying and calcining the co-precipitated mixed metal oxide composite.

EXAMPLES

The following non-limiting examples shall serve to illustrate the various embodiments of the present invention. In each of the examples, the carrier was cordierite.

Example 1

An exemplary mixed metal oxide comprising by weight 5% titania ($TiO_2$) as a transition metal oxide (TMO), 5% lathana as a stabilizer/dopant, and balanced with zirconia (main component) (Ti—La—$ZrO_2$) was prepared as follows. An aqueous solution of zirconium nitrate was prepared to form solution 1. An aqueous solution of lanthanum nitrate was prepared, to which a precursor of titania (Ti—(V)-ethoxide) was added to form solution 2. Solutions 1 and 2 were added to an aqueous solution of ammonia ($NH_3$) and the mixture was held at a pH of ~9.0 for 15 minutes under mixing conditions. The mixture was divided and dried in an autoclave for 12 hours at 150° C. Lauric acid was added to increase the surface area of the final product. A filtrate was obtained using a filter, which was then washed with ammonia (25% solution) to remove the nitrates. The filtrate was then dried at 40° C. and calcined at 700° C.

The composite was tested for surface area using the BET method. The fresh composite had a surface area of 70 $m^2/g$ and an aged composite (1000° C. for 12 hours oven aging) had a surface area of 15 $m^2/g$.

Example 2

Comparative

For comparison, a 10 wt.-% lanthana and 90 wt.-% zirconia composite (La—$ZrO_2$) made the same way as the Ti—La—$ZrO_2$ composite of Example 1. The comparative composite was tested for surface area using the same test method used in Example 1. The comparative composite had a fresh surface area of 83 $m^2/g$ and an aged composite (1000° C. for 12 hours oven aging) surface area of 25 $m^2/g$.

Example 3

Catalytic material was prepared comprising rhodium (Rh) supported on the Ti—La—$ZrO_2$ composite of Example 1. Specifically, a 0.25 wt % Rh nitrate solution was impregnated onto the composite using standard incipient wetness techniques. This material was dried at 120° C. and then calcined at 550° C. for 1 hour in air. For testing purposes, the catalytic material was shaped by slurrying with zirconium acetate (5 wt % on the composite), drying under stirring, calcining at 550° C. for 2 hours in air, and crushing/sieving to 250-500 μm. The shaped catalytic material was aged at 950° C. for 5 hours in 10% water under lean rich cycle.

Example 4

Comparative

A comparative catalytic material was prepared comprising rhodium (Rh) supported on the La—$ZrO_2$ composite of Comparative Example 2. Specifically, a 0.25 wt % Rh nitrate solution was impregnated onto the composite using standard incipient wetness techniques. This material was dried at 120° C. and then calcined at 550° C. for 1 hour in air. For testing purposes, the catalytic material was shaped by slurrying with zirconium acetate (5 wt % on the composite), drying under stirring, calcining at 550° C. for 2 hours in air, and crushing/sieving to 250-500 μm. The shaped catalytic material was aged at 950° C. for 5 hours in 10% water under lean rich cycle.

Example 5

Testing

The aged catalytic materials of Example 3 and Comparative Example 4 were tested under a lambda sweep protocol at different temperatures (250, 300, 350, and 450° C.). Conditions were: GHSV=70000 $h-1$ (normalized to 1 mL coated catalyst) and oscillating feed (λavg±0.05, 1 sec lean, 1 sec rich, 180 sec/position).

Figure 2:
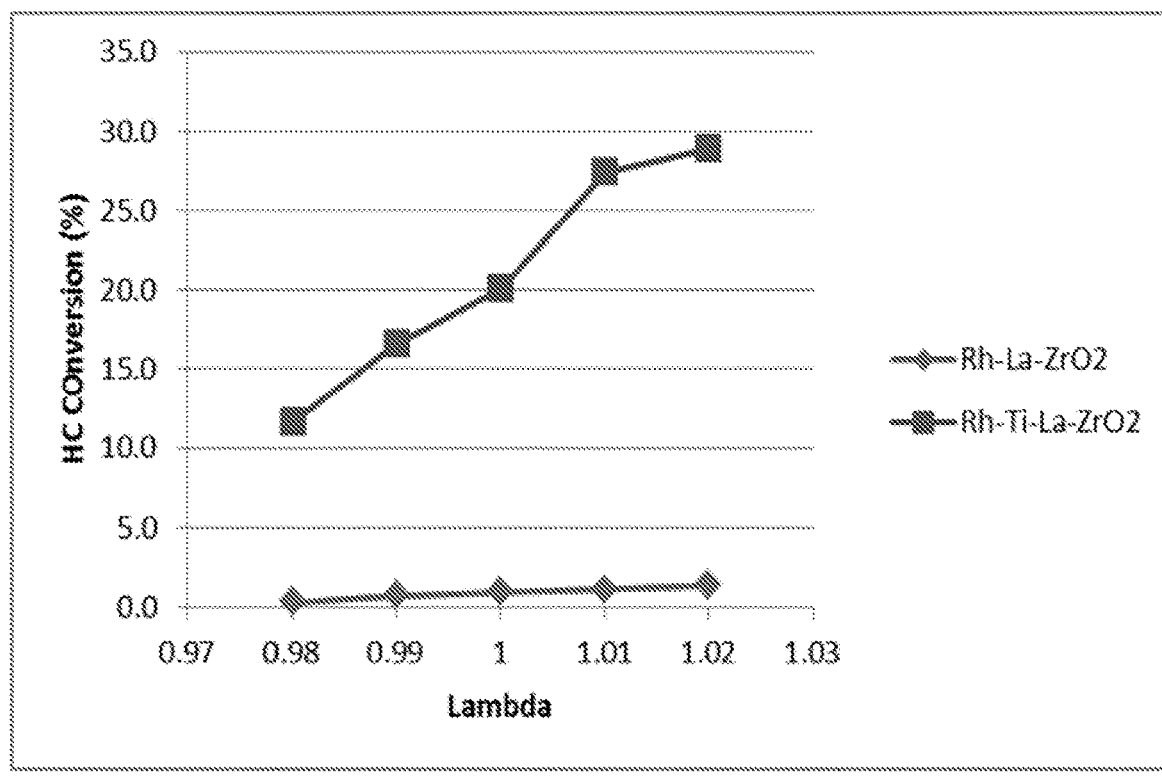
FIG. 2 provides a graph of hydrocarbon (HC) conversion versus lambda at 300° C.
Figure 3:
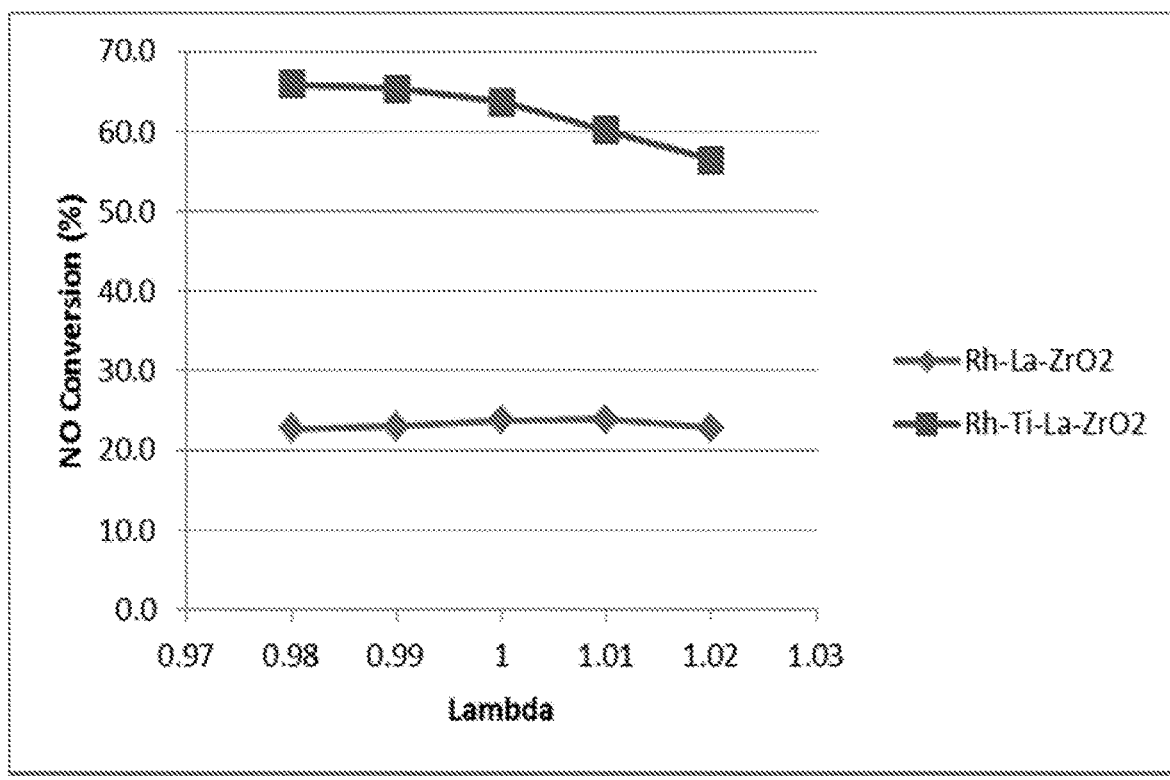
FIG. 3 provides a graph of nitrogen oxides (NO) conversion versus lambda at 300° C.

At 300° C., the catalytic material using Ti—La—$ZrO_2$ composite of Example 1 showed superior performance as compared to a catalytic material using a commercially available La—Zr composite. For higher temperatures, the performances of the different catalytic materials were not significant. Effective performance at below 350-400° C. is desired to help lower emissions during cold-start and to boost light-off performance. FIGS. 1-3 show the emissions conversions (carbon monoxide (CO), hydrocarbon (HC), and nitrogen oxides (NO)) for the catalytic materials of Example 3 and Comparative Example 4 at 300° C.

Example 6

A formulated automotive catalyst composite comprising catalytic material comprising two layers on a carrier was prepared. The total precious metal loading was 60 $g/ft^3$ and with a Pt/Pd/Rh ratio of 0/55/5. The substrate had a cell density of 600 cells per square inch and with wall thickness of approximately 4 mil (or 101.6 μm). The size of the substrate was 4.66×3 inches and the volume was 51.17 $in^3$.

A bottom layer deposited on the carrier comprised palladium (Pd), a portion of which was supported by a ceriazirconia oxygen storage component (OSC) and another portion of which was supported by a high surface area gamma-alumina support. The bottom layer also contained baria and zirconia. The loading of the bottom layer was 2.332 $g/in^3$.

A top layer deposited on the bottom layer comprised the rhodium (Rh) on a support that comprised 5% $TiO_2$ impregnated onto a commercial La—$ZrO_2$ having a lanthana content of 9 wt-%. The loading of the top layer was 1.403 $g/in^3$.

Example 7

Comparative

A comparative formulated automotive catalyst composite comprising catalytic material comprising two layers on a carrier was prepared. The total precious metal loading was 60 $g/ft^3$ and with a Pt/Pd/Rh ratio of 0/55/5. The substrate had a cell density of 600 cells per square inch and with wall thickness of approximately 4 mil (or 101.6 μm). The size of the substrate was 4.66×3 inches and the volume was 51.17 $in^3$.

A bottom layer deposited on the carrier comprised palladium (Pd), a portion of which was supported by a ceriazirconia oxygen storage component (OSC) and another portion of which was supported by a high surface area gamma-alumina support. The bottom layer also contained baria and zirconia. The loading of the bottom layer was 2.332 $g/in^3$.

A top layer deposited on the bottom layer comprised the rhodium (Rh) on a commercial La—$ZrO_2$ support having a lanthana content of 9 wt-%. The loading of the top layer was 1.403 $g/in^3$.

Example 8

Testing

The formulated catalyst composites of Example 6 and Comparative Example 7 were aged at 950° C. for 5 hours in 10% water under lean/rich cycles. The aged composites were tested under a lambda sweep protocol at different temperatures (300, 350, and 450° C.). Conditions were: GHSV=125000 $h-1$ (normalized to 1 mL coated catalyst) and oscillating feed (λavg±0.025, 0.5 sec lean, 0.5 sec rich, 50 sec/position).

Figure 4:
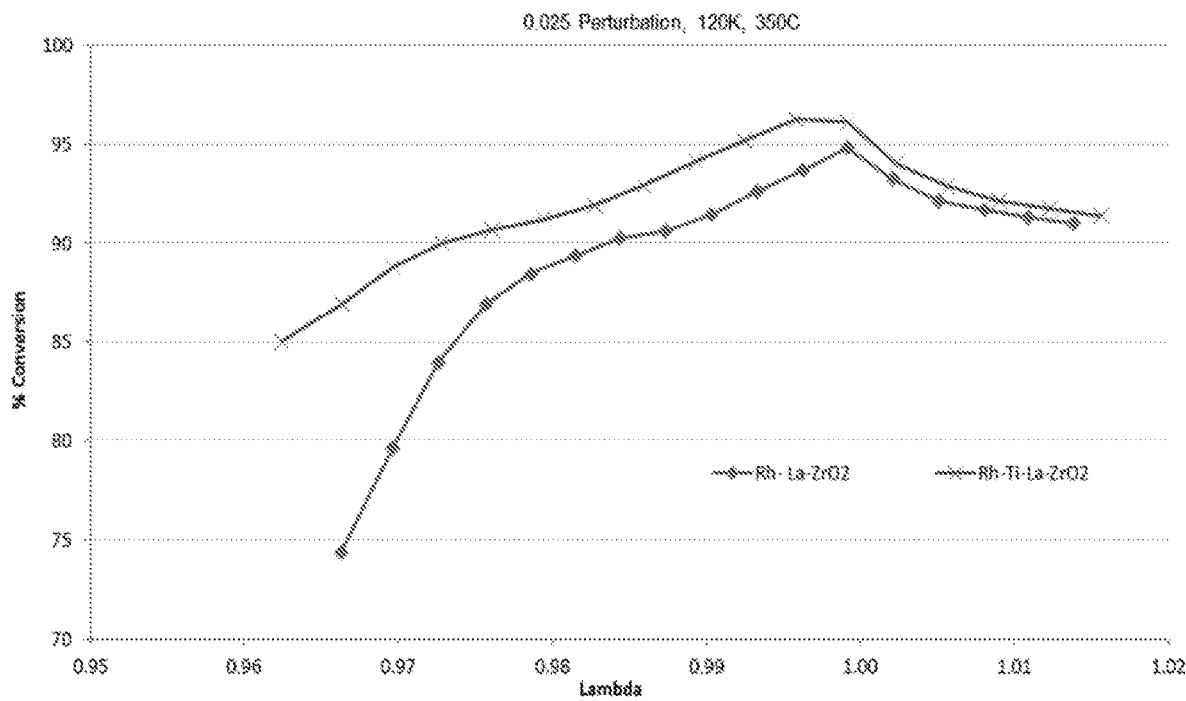
FIG. 4 provides a graph of hydrocarbon (HC) conversion versus lambda at 350° C.
Figure 5:
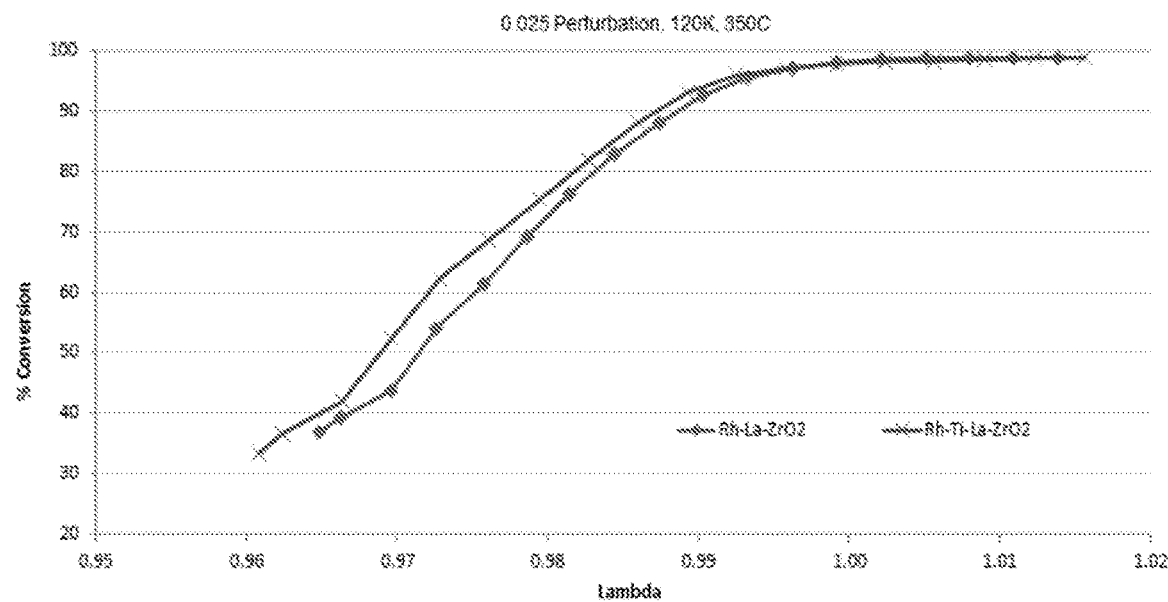
FIG. 5 provides a graph of carbon monoxide (CO) conversion versus lambda at 350° C.

The catalyst composite of Example 6 showed an advantage for conversion of hydrocarbons (HC) at 300-350° C. FIG. 4 shows the emissions conversion of hydrocarbon (HC) for the formulated catalyst composites of Example 6 and Comparative Example 7 at 300-350° C.—especially under rich conditions. At 400° C. or above, there was not a significant advantage. As shown in FIG. 5, for carbon monoxide (CO) conversion, the catalyst composite of Example 6 showed an improvement at 300-350° C. For nitrogen oxides (NO) conversions, there was not a significant difference, but it is noted that the catalyst testing method itself may be a contributing factor, i.e., NOx conversion is too high to differentiate the different between the two catalysts, not the difference in support materials.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A method of making a composite of mixed metal oxides comprising:
    obtaining or forming a first aqueous solution of a salt of zirconium, a salt of a metal promoter selected from lanthanum, neodymium, gadolinium, praseodymium, samarium, and mixtures thereof, and, optionally, a salt of a stabilizer selected from barium, calcium, magnesium, strontium and mixtures thereof;
    obtaining or forming a second aqueous solution of a salt of titanium;
    mixing the first and second aqueous solutions; and
    co-precipitating the zirconium, the optional metal of the promoter or stabilizer, and the titanium under basic conditions; thus forming a co-precipitated mixed metal oxide composite.

2. The method of claim 1, wherein the co-precipitated composite of mixed metal oxides comprises by weight of the composite:
    zirconia in an amount in the range of 55-99%; titania in an amount in the range of 1-25%;
    a promoter and/or a stabilizer in an amount in the range of 0.1-20%.

3. The method of claim 1, further comprising drying and calcining the coprecipitated mixed metal oxide composite.

4. A method of making a composite of mixed metal oxides comprising:
    obtaining a co-precipitated zirconia and metal promoter selected from lanthanum, neodymium, gadolinium, praseodymium, samarium, and mixtures thereof and optional stabilizer selected from barium, calcium, magnesium, strontium and mixtures thereof;
    obtaining an aqueous solution of a precursor of titanium;
    impregnating the co-precipitated zirconia and metal promoter with the precursor of titanium;
    thus forming a mixed metal oxide composite.

5. The method of claim 4, wherein the mixed metal oxide composite comprises by weight of the composite:
    zirconia in an amount in the range of 55-99%; titania in an amount in the range of 1-25%;
    a promoter and/or a stabilizer in an amount in the range of 0.1-20%.

* * * * *